(No Model.)
O. P. AMEND & J. H. MACY.
PROCESS OF DESULPHURIZING OILS.
No. 480,311. Patented Aug. 9, 1892.
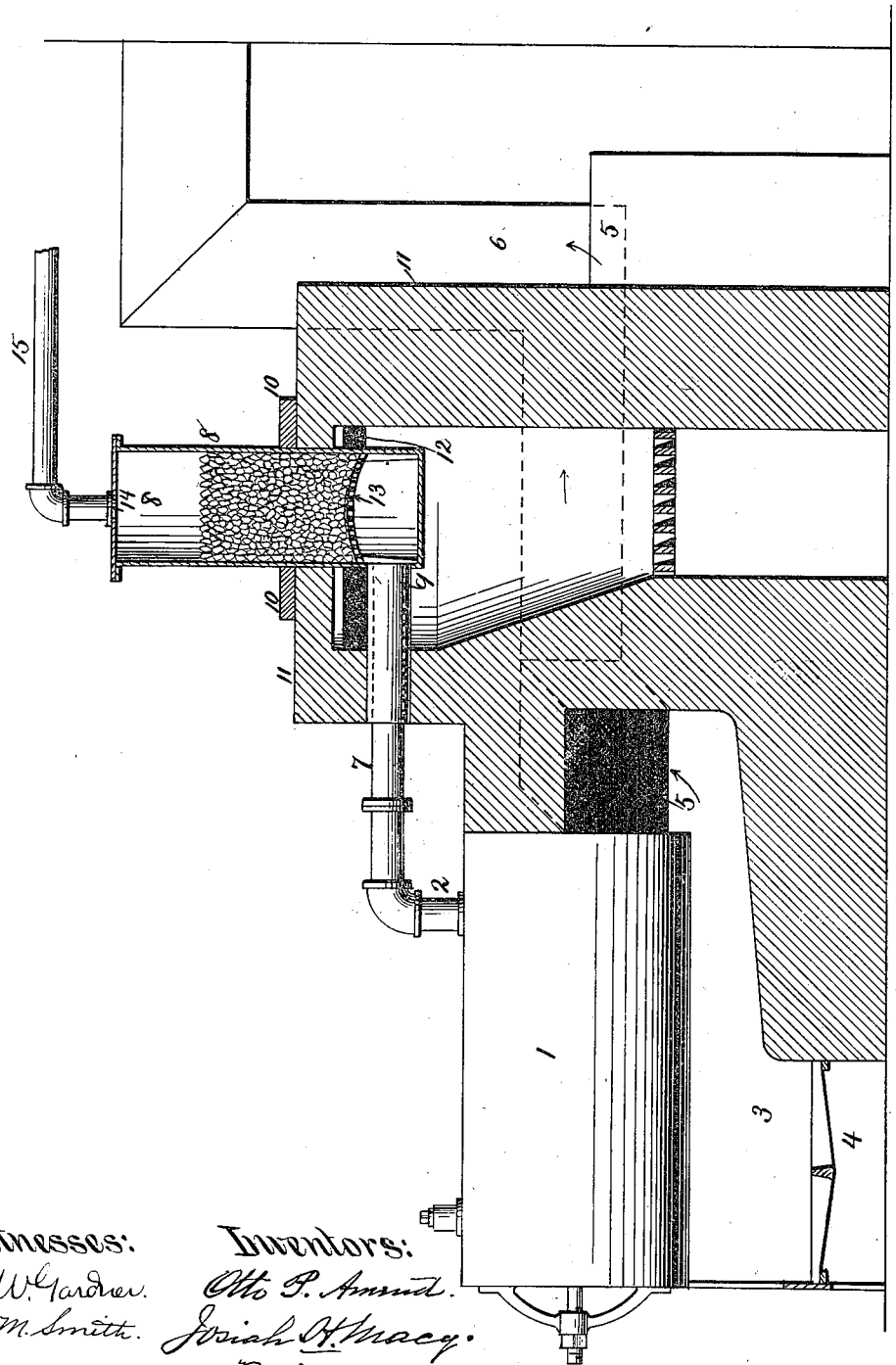
Witnesses:
D. W. Gardner.
H. M. Smith.
Inventors:
Otto P. Amend.
Josiah H. Macy.
By J. H. Macy, Atty.

UNITED STATES PATENT OFFICE.

OTTO P. AMEND, OF NEW YORK, AND JOSIAH H. MACY, OF HARRISON, NEW YORK.

PROCESS OF DESULPHURIZING OILS.

SPECIFICATION forming part of Letters Patent No. 480,311, dated August 9, 1892.

Application filed February 18, 1892. Serial No. 421,919. (No specimens.)

*To all whom it may concern:*

Be it known that we, OTTO P. AMEND, residing at New York, in the county of New York, and JOSIAH H. MACY, residing at Harrison, in the county of Westchester, State of New York, citizens of the United States, have invented a new and useful Process of Desulphurizing Oils, of which the following is a specification.

It is well known that in the effort to refine petroleum-oils containing sulphur compounds, as Ohio and Canadian oils, much difficulty has been experienced in eliminating the sulphur and in producing an oil that will not show sulphur reaction after an interval of time. Hitherto the majority of those attempting to desulphurize oil have mixed one or more chemical agents with the oil while in liquid condition, and have depended upon such chemicals to effect an entire elimination of the sulphur present in accordance with what has been supposed to be the usual law of chemical action. In some instances heat has been applied to hasten such action. Metallic oxides, alkalies, fuming sulphuric and nitric acid have been used in this manner without effecting a satisfactory result. Others operating with the same end in view have first vaporized the oil and then subjected the oil-vapor to the action of various chemicals in the presence of heat, with a belief that the action of the chemicals upon the oil while in a state of vapor was more satisfactory than when in a liquid condition. In the latter case the heat applied has been somewhat higher than was necessary to complete a distillation of oil; but we are led to believe that neither of these methods as hitherto applied will so purify the oil that sulphur reaction will not develop after a short interval of time, and this of necessity must be the case while sulphur remains in the oil, as it does in both of the cases cited. We have discovered that sulphur and all sulphur compounds can be removed from the above-named oils and that sulphur reaction does not occur in oil treated by a proper process.

We attain the practical desulphurization of oils containing sulphur by vaporizing the oil and subjecting the oil-vapor, together with the sulphur or sulphur compounds contained in it, to a degree of heat above the boiling-point of sulphur, and by this means vaporizing the sulphur and cracking or splitting up its compounds, and then exposing the vaporized sulphur and its cracked or split-up compounds to the action of such chemical agents or reagents as they have an affinity for or to such as will act upon or will combine with them while in this vaporized, cracked, or split-up condition and then liquefying the oil. When treated as described, it will be found that the sulphur and sulphur compounds have been so changed that practically no sulphur can be found in the oil, and it may be treated for further refinement by any of the well-known methods of treating petrolum-oils.

The degree of heat required to vaporize sulphur at the pressure of the atmosphere is 440° centigrade, and we find that the heat needed to effect entirely satisfactory work must be sufficiently above this temperature to insure the entire vaporization of the sulphur and the cracking or splitting up of the sulphur compounds. We prefer a red heat clearly distinguishable in daylight, and have found temperatures between 700° and 1,200° centigrade very successful in practical working. We have established these temperatures by comparing the colors obtained with the colors specified by competent technical authority as corresponding to the temperatures named, the colors ranging from a dark red to a bright orange.

We have found many chemical agents that will unite with sulphur when vaporized or split up, as various metals, their oxides, and suboxides. The hydrates and oxides of the alkalies have also given very good results; but we prefer such agents or reagents as have an oxidizing effect, among which we have found manganese dioxide and other higher oxides of manganese, barium peroxide, the manganates and permanganates, the chromates and bichromates, chromic iron-ore, and binoxide of lead to be very successful. Binoxide of manganese is a cheap agent and has given excellent results. We have found it an advantage to use a caustic alkali that will stand the heat, as caustic lime or barium, with the binoxide. We find that when using caustic lime with binoxide of manganese that much less binoxide is required, and the cost is thus reduced. The color of the distillate is improved by the use of an alkali, and the very offensive smell usually attending the distillations of oil containing sulphur or sulphur compounds is almost entirely done away with, as the oxygen of the manganese operates to oxidize the sulphur fumes or the split-up gaseous sulphur compounds, while the caustic alkali seems to act as a revivifier of the oxidizing agent. In some cases we may use one or more of the alkalies or alkaline earths separately or collectively; but we have claimed this modification or division of our invention in another and separate application filed June June 10, 1892, Serial No. 436,216.

The process will be fully understood by referring to the accompanying drawing, which illustrates one means of carrying out our invention.

The numeral 1 represents a plain still, such as is generally used for distilling oil.

2 is the outlet for oil-vapors passing from the still.

3 is the fire-chamber under the still, and 4 the ash-pit.

5 represents the flue from the still-furnace. It is shown running behind the flue of the auxiliary furnace and side by side with it, yet separated by a partition until they meet at the outlet of each at the smoke-stack 6.

7 is the pipe that conveys the oil-vapor, with the heated sulphur and sulphur compounds, to the superheater and chemical box 8. This box is made of thick cast-iron and has a thick pipe 9 cast with it, which projects from one side near the bottom and communicates with the oil-vapor pipe 7 of the still. The box 8 is held in position by a heavy iron clamp 10, which rests upon the top of the furnace 11. The furnace 11 has a return-flue somewhat similar to that of a smelting-furnace, with an opening leading from the furnace at 12, running thence downward until it is about in line with the main flue 5 from the furnace of the still. It then runs side by side with the flue of the still-furnace until it opens into the smoke-stack.

The fire-pot of the furnace 11 is quite deep to hold a considerable body of fuel, and its sides flare or diverge a little more on the side where pipe 9 is exposed than on the other, with a view of heating the pipe very hot.

The box is so suspended that its lower part projects into the combustion-chamber of the furnace 11 a short distance, depending entirely upon the size of the box, that the lower part of the box, and particularly the pipe 9, may be heated throughout, as far as exposed in the furnace, to a bright-red heat, especial care being exercised to see that the top of the pipe is so heated, as the currents of gas tend to follow the upper side of the pipe. There is a space of several inches above the pipe, and the brickwork behind it is set out to almost touch the pipe, that the flame may be forced first under and then over the top of the pipe to heat it sufficiently and homogeneously.

The box 8 is provided with a perforated support 13, upon which the chemicals are placed that combine with or act upon the sulphur and sulphur compounds when the latter are sufficiently heated.

14 is the outlet to the pipe 15, through which the oil-vapor passes to the condenser to be liquefied.

The operation is as follows: The oil to be desulphurized is put in the still 1. The chemical or oxidizing agent to be used—say, for instance, binoxide of manganese—having been mixed with a little plaster-of-paris, properly dried and cut or broken into small cubes or pieces, is placed on the support 13 in box 8, together with the caustic alkali—for instance, caustic lime—prepared in the same manner. As a rule, they are placed in layers alternately, although not always. The auxiliary furnace is then fired up, and when the box 8 and pipe 9 begin to redden the fire under the still 1 is started. By the time the vapors begin to pass over the part of the box and the pipe exposed in the furnace will be bright red. As the vapors are discharged from the still 1 they carry with them more or less sulphur, and upon its admission into the red-hot pipe 9 the sulphur and sulphur compounds are heated to a degree above the boiling-point of sulphur or above 440° centigrade at the pressure of the atmosphere. This operates to vaporize the sulphur and to crack or split up the sulphur compounds, which pass while in this condition through the perforated support 13 into the immediate presence of and in contact with the chemicals placed upon said support, the binoxide of manganese (if this is the oxidizing agent used) operating to thoroughly oxidize the vaporized sulphur and the split-up and vaporized sulphur compounds, which result is not obtained when the oil-vapor, with its accompanying charge of sulphur, is heated to any degree of temperature below the boiling-point of sulphur. The oil-vapor having passed through the chemicals in box 8 then passes from said box through its outlet 14 and pipe 15 to condensers, (not shown,) wherein it is liquefied. The oil thus desulphurized can then be treated by any of the well-known methods for treating petroleum distillate.

No especial form of apparatus is required to carry out this process. No pressure is indicated by pressure-gage connected with the still during the operation.

Having described our invention, what we claim as new, and desire to secure by Letters Patent of the United States, is—

1. The process of desulphurizing oil, which consists in vaporizing the oil containing the sulphur and heating the oil-vapor to a degree of heat at or above the boiling-point of sulphur, exposing the oil-vapor so heated to the action of one or more chemical reagents that will combine with sulphur or sulphur compounds, and then condensing the oil-vapor.

2. The process of desulphurizing oil, which consists in vaporizing the oil containing sulphur and heating the oil-vapor to a degree of heat at or above the boiling-point of sulphur, exposing the oil-vapor so heated to the action of an oxidizing agent capable of combining with sulphur or sulphur compounds, and then condensing the oil-vapor.

3. The process of desulphurizing oil, which consists in vaporizing the oil containing the sulphur and heating the oil-vapor to a degree of heat at or above the boiling-point of sulphur, exposing the oil-vapor so heated to the action of an oxidizing agent and a caustic alkali, and then condensing the oil-vapor.

OTTO P. AMEND.
JOSIAH H. MACY.

Witnesses:
ANDREW SCHENCK,
G. SCHWEIKERT,